(12) United States Patent  
Norstad

(10) Patent No.: US 9,415,828 B2  
(45) Date of Patent: Aug. 16, 2016

(54) ADJUSTABLE BICYCLE DROPOUT INTEGRATED WITH WHEEL SKEWER

(71) Applicant: Mark Christopher Norstad, Richmond, CA (US)

(72) Inventor: Mark Christopher Norstad, Richmond, CA (US)

( * ) Notice: Subject to any disclaimer, the term of this patent is extended or adjusted under 35 U.S.C. 154(b) by 0 days.

(21) Appl. No.: 14/523,863

(22) Filed: Oct. 25, 2014

(65) Prior Publication Data

US 2015/0259026 A1    Sep. 17, 2015

Related U.S. Application Data

(60) Provisional application No. 61/953,223, filed on Mar. 14, 2014.

(51) Int. Cl.
*B62K 25/02* (2006.01)
*B62K 19/24* (2006.01)

(52) U.S. Cl.
CPC ............. *B62K 25/02* (2013.01); *B62K 19/24* (2013.01)

(58) Field of Classification Search
CPC ... B62K 19/24; B62K 25/02; B62K 2025/025
USPC ........... 280/93, 103, 124.11, 149.1, 269, 288, 280/FOR. 105; 301/110.5, 111.01, 111.06, 301/111.07
See application file for complete search history.

(56) References Cited

U.S. PATENT DOCUMENTS

| | | | |
|---|---|---|---|
| 5,364,115 A | 11/1994 | Klein et al. | |
| 7,918,474 B2 | 4/2011 | Waxham | |
| 8,075,010 B2 | 12/2011 | Talavasek et al. | |
| 8,424,894 B2 | 4/2013 | Cleveland | |
| 2012/0274042 A1 | 11/2012 | Harris et al. | |
| 2014/0054873 A1* | 2/2014 | Cocalis | B62K 3/02 280/281.1 |

* cited by examiner

*Primary Examiner* — Anne Marie Boehler
*Assistant Examiner* — Felicia L Brittman
(74) *Attorney, Agent, or Firm* — Steven A. Nielsen; www.NielsenPatents.com

(57) ABSTRACT

An adjustable rear wheel dropout system includes an over center clamp, toggle clamp or four bar link mechanism to tension a bicycle's chain or belt drive system. A toggle clamp system moves the rear axle as needed to achieve the desired tension in the chain or belt. The over center toggle clamp system is also useful in facilitating the repeatable reinstallation of a rear wheel in a predetermined position. A wheel skewer system secures or locks the adjustable rear wheel dropout in the desired location. The dropout system includes a chain stay adjustment area or void to allow the wheel skewer to be inserted though the dropout. After the end position is secured by the toggle system, the wheel skewer further secures the dropout position as the wheel skewer is tightened to secure the wheel to the bicycle.

8 Claims, 11 Drawing Sheets

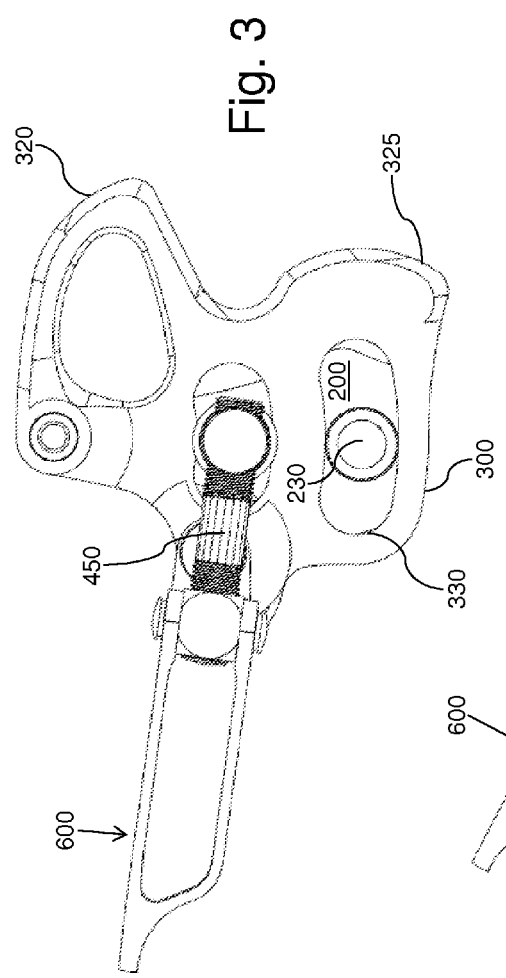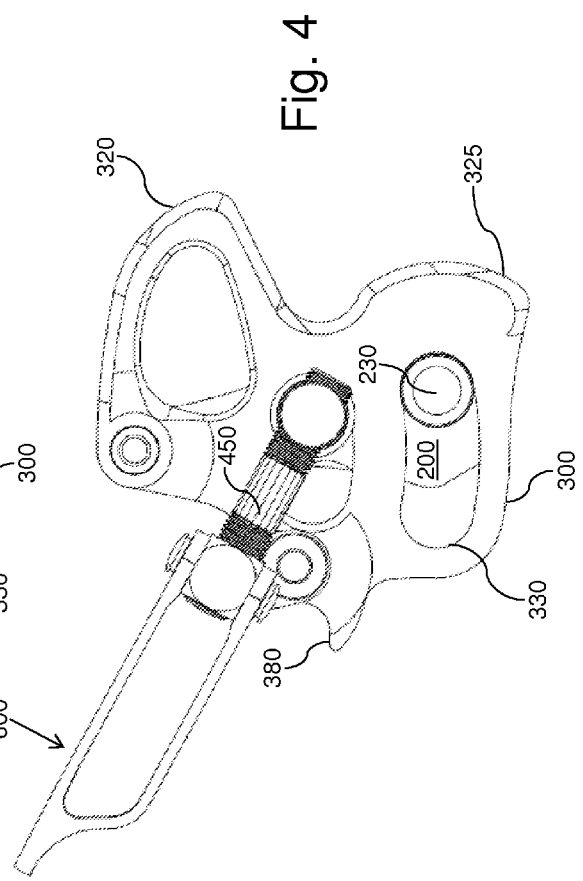

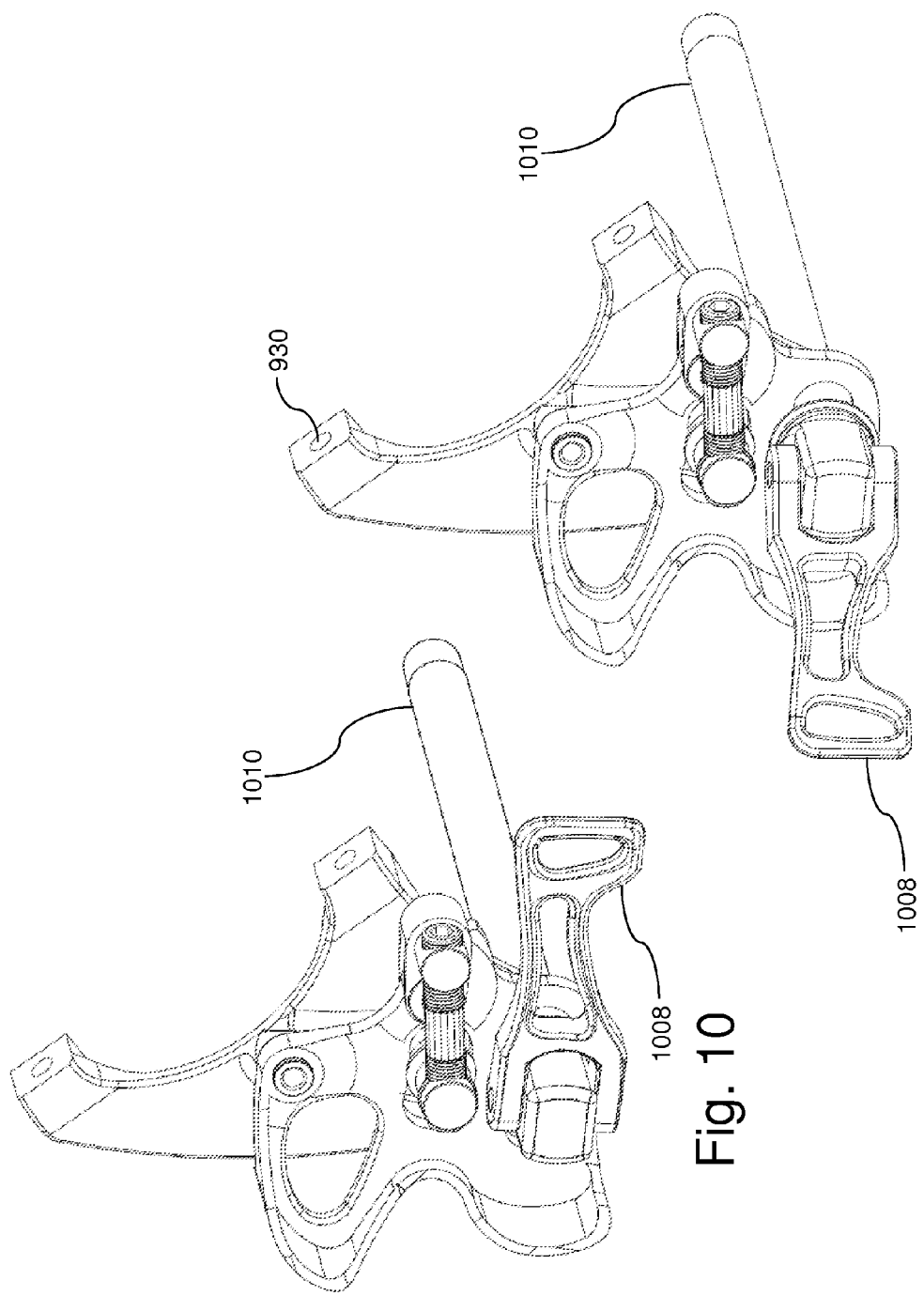

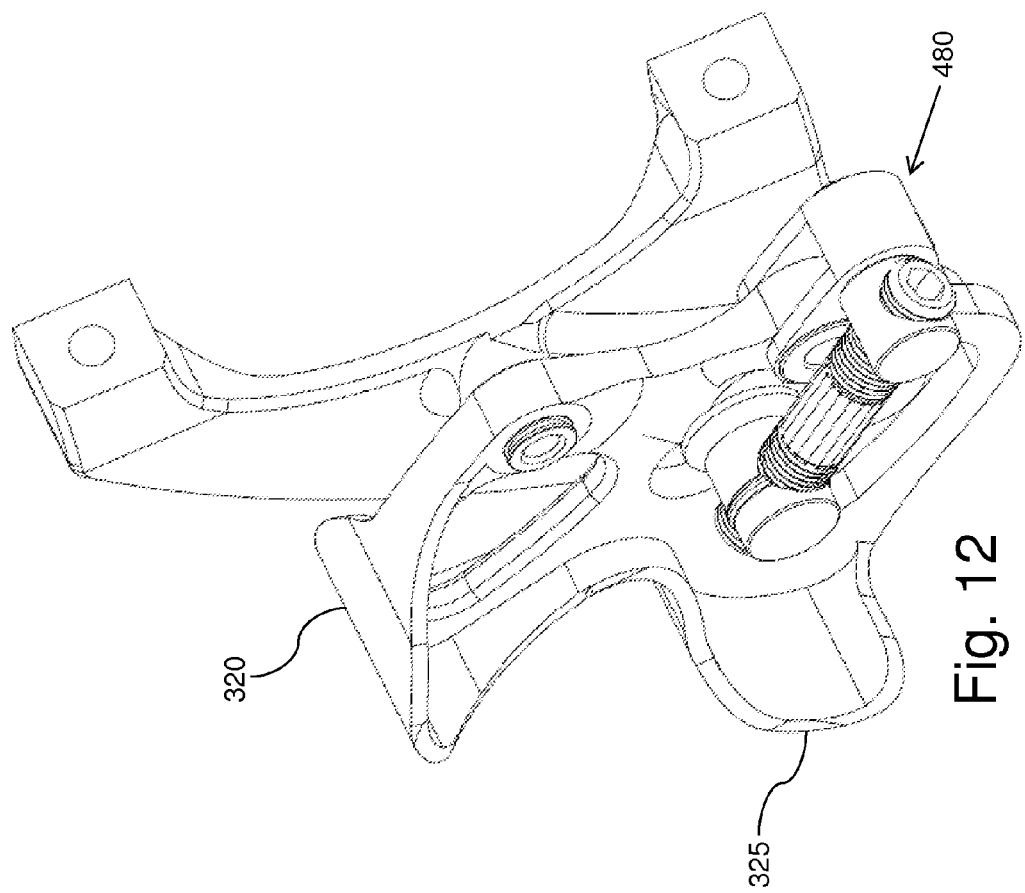

ADJUSTABLE BICYCLE DROPOUT INTEGRATED WITH WHEEL SKEWER

RELATED PATENT APPLICATION AND INCORPORATION BY REFERENCE

This is a utility application based upon U.S. patent application Ser. No. 61/953,223 filed on Mar. 14, 2014. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND OF THE INVENTION (1) Field of the Invention

The invention generally relates to bicycle frame components. More particularly, disclosed embodiments relate to adjustable dropout systems.

(2) Description of the Related Art

U.S. Pat. No. 8,424,894 by Cleveland issued on Apr. 23, 2013 discloses a dropout receiver system useful for attachments of accessories. Cleveland features various mounting surfaces to adapt a bicycle frame to different drive train configurations.

U.S. Pat. No. 5,364,115, by Klein et al issued on Nov. 15, 1994 discloses bicycle dropout fitting designs for use with lightweight materials.

U.S. Pat. No. 7,918,474 by Waxham issued on Apr. 5, 2011 discloses a bicycle dropout system designed for ease of maintenance and for adjusting the tension of a chain or belt.

U.S. Pat. No. 8,075,010 by Talavasek et al issued on Dec. 13, 2011 discloses a dropout system with a lip designed to receive an end cap.

U.S. Published Patent Application by Alsop 20130093160 published on Apr. 18, 2013 discloses a pivot dropout system.

U.S. Published Patent Application 20120274042 by Harris et al published on Nov. 1, 2012 discloses a dropout system with replaceable components to accommodate hubs of different sizes.

In general, a dropout system comprises a rear axle attachment structure. A dropout system may be welded or otherwise attached to a chain stay and seat stay. A dropout system may allow a rear wheel to drop or otherwise release from the frame upon loosening axle attachment components. After a rear wheel is removed, there is a challenge to reinstall the wheel to the correct location. With the growing popularity of single sprocket bicycles and belt systems, the ability to repeatedly reinstall a rear wheel in the correct location has become increasingly difficult because belt drive systems require precision tensioning to achieve mechanical efficiencies that approach those of a traditional chain drive system. Thus, there is room in the art for the presently disclosed embodiments.

BRIEF SUMMARY OF THE INVENTION

The present invention overcomes shortfalls in the related art by presenting an unobvious and unique combination, configuration and use of mechanical components to secure dropout components and rear axles in original or predetermined positions, providing the desired tension for use of either chain drive or belt drive systems. Disclosed embodiments include adjustable dropout systems facilitating in-tension positioning of rear axles and retaining a rear axle positioning during the tightening or adjustment process. Disclosed embodiments provide mechanical advantage in constantly positioning an axle in tension with a chain or belt while allowing the user to obtain and fasten the position with reasonable barehanded force. Disclosed embodiments may include an off center toggle system having pivot points not directly centered over the axle. The disclosed mechanical movements of the toggle system overcome short falls in the art by use of few components and ergonomic efficiencies eliminating the need for tools which are often needed to achieve the appropriate tension for belt systems of single sprocket bicycles.

Disclosed adjustable dropouts may include voids occupied by wheel skewers. As a dropout and/or axle is adjusted, a wheel skewer remains within a dropout void. After the toggle system is in a closed position, the dropout is further secured in position by the normal tightening of the wheel skewer as the wheel skewer become frictionally attached to the dropout. The wheel skewer attachment to the dropout provides levered retention of the dropout as the skewer to dropout attachment is distant from the toggle clamp pivot point. The disclosed two pronged approach of securing dropout and axle position is a significant improvement over the prior art. By use of two frictional connections, forces exerted upon the dropout during bicycle riding are artfully contained.

BRIEF DESCRIPTION OF THE DRAWINGS

FIG. 3 is a plan view of a disclosed embodiment
FIG. 4 is a plan view of a disclosed embodiment
FIG. 10 is a perspective view of a disclosed embodiment with a wheel skewer
FIG. 11 is a perspective view of a disclosed embodiment with a wheel skewer
FIG. 12 is a perspective view of a disclosed embodiment

REFERENCE NUMERALS IN THE DRAWINGS

Figure 1:
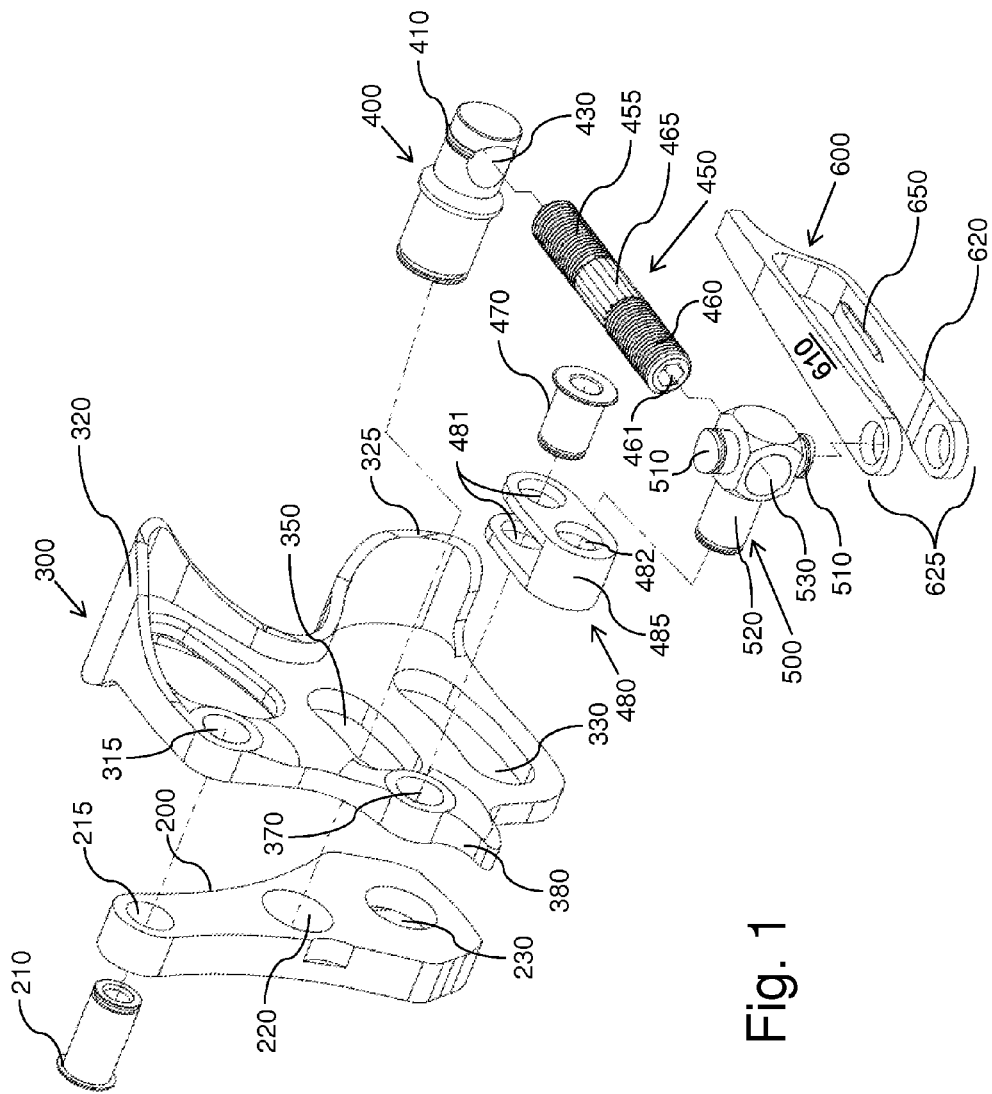
FIG. 1 is a perspective view of a disclosed embodiment

200 swing plate
210 swing plate pivot pin
215 swing void of swing plate 200
220 swing plate adjustment pin void
230 skewer void of the swing plate 200
300 main plate
315 swing void of main plate or main plate swing void
320 seat stay attachment point
325 chain stay attachment point
330 skewer void defined by the main plate or main plate skewer void
350 void for swing plate adjusting pin
370 void defined within the main plate 300, the void accepting the link pivot pin 470, or main plate link pivot void
380 link stop 400 swing plate adjustment pin
410 detent for external lever
430 void for turn buckle screw or swing plate adjustment pin void
450 turn buckle screw
455 right hand thread
460 left hand thread
461 hexagon void, comports to a hex wrench
465 ribbed area for hand adjustment
470 link pivot pin
480 link
481 medial voids of link
482 distal voids of link
485 arc of link 480, may compliment link stop 380
500 right turn buckle screw nut
510 extension lever pins
520 link adjusting pin
530 void for turn buckle screw
600 extension lever or toggle lever
610 first flexible leg
620 second flexible leg
625 medial voids of the extension lever 600 or toggle lever
650 retention groove
700 left turn buckle screw nut
800 main plate of left side, a mirror image of main 300 of right side
900 swing plate of left side, shown with post mount brake caliper mount
930 brake caliper mounting bosses
1007 axle nut
1008 quick release lever of wheel skewer
1010 axle
1320 seat stay
1325 chain stay These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Disclosed Embodiments

FIG. 1 presents the right side components. The terms "right" and "left" may be interchangeable herein and are used herein to describe orientations typically found in current bicycles. The presented right side components may comprise a first pivot system comprising a swing plate pivot pin 210 which pivots within swing void 215, the swing void defined within a swing plate 200. The swing plate pivot pin 210 is rotationally attached to or within a swing void 315 of the main plate 300. The first pivot system allows the swing plate 200 to rotate. By virtue of the swing plate pivot pin 210, the swing plate may move like a pendulum with respect to the main plate.

The first pivot system is secured in a fixed position, whereas the second pivot system comprises swing plate adjustment pin 400 that moves within an expanded or oblong void 350 for the swing plate adjustment pin. The void 350 is defined within the midsection of the main plate 300. The void 350 for the swing plate adjustment pin may define the range of a pendulum swing or rotation of the swing plate 200. The second pivot system may further comprise the swing plate adjustment pin 400 inserted through the oblong void 350 and into and secured to the swing plate adjustment pin void 220, the void defined within the swing plate 200. The oblong void 350 is defined within the main plate 300.

A third pivot system may comprise a link pivot pin 470 hingedly connected to a medial set of voids 481 defined within a link 480. The third pivot system may be further defined by the link pivot pin 470 hingedly attached to a void 370 defined by the main plate 300. The third pivot system may allow the link 480 to rotate around the link pivot pin 470.

A fourth pivot system may comprise a link adjusting pin 520 hingedly attached within distal voids 482 of the link 480.

A fifth pivot system may comprise an extension lever pin 510 disposed within a right turn buckle screw nut 500 and an extension lever 600 hingedly attached to the extension lever pins 510. The extension lever 600 may comprise one or more medial voids 625, with the medial voids in rotational attachment to the extension lever pins 510.

The right turn buckle screw nut 500 may define a threaded void 530 threaded to accept a turn buckle screw 450. The swing plate adjustment pin 400 may define a threaded void 430 threaded to accepted the turn buckle screw 450. The turn buckle screw 450 may comprise right hand threads 455, a ribbed area 465 for hand adjustment and left hand threads 460. Either end of the turn buckle screw 450 may define hexagon voids 461 or other voids suitable for fasteners.

To secure a final position, the turn buckle screw 450 may be turned to adjust the relative position between the main plate 300 and swing plate adjustment pin void 220. The extension lever 600 may be lowered such that the extension lever's first flexible leg 610 and second flexible leg 620 are parallel to the main plate 300. A skewer shaft or other component may extend though the skewer void 230 of the skewer plate 200 into the skewer void 330 of the main plate 300. The arc 485 of the link 480 may be blocked or otherwise restrained by the link stop 380 of the main plate 300.

Figure 2:
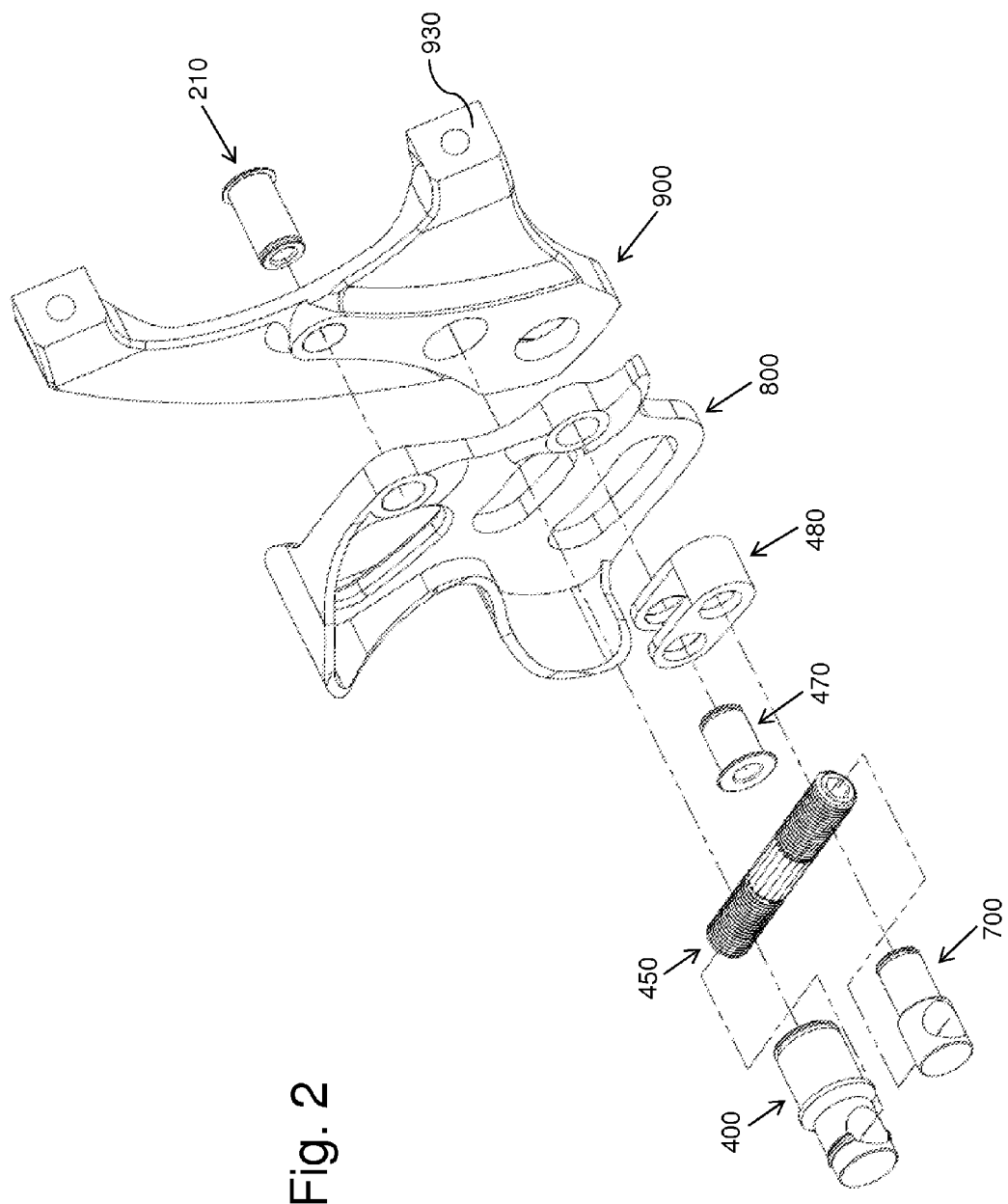
FIG. 2 is a perspective view of a disclosed embodiment

FIG. 2 presents left side components that for the most part, mirror several right side components of FIG. 1. The left side components of FIG. 2 include a swing plate adjustment pin 400, left turn buckle screw nut 700, turn buckle screw 450, link pivot pin 470, link 480, left main plate 800 and swing plate 900. The swing plate 900 is shown with mounting bosses 930. A swing plate pivot pin 210 is also shown. The left side components or opposite side components may be adjusted or set using hand tools. The left side components are not typically moved during the remounting of a wheel. Thus, the left side components typically don't have an extension lever or toggle lever.

FIG. 3 presents a turn buckle screw 450 in a relatively horizontal position with the skewer void 230 of the swing plate centered within the skewer void 330 of the main plate 300.

FIG. 4 presents a turn buckle screw 450 in a relatively upward position with the skewer void of the swing plate urged to the chain stay end of the skewer void 330 of the main plate. The angle of the turn buckle screw 450 may be moved by use of the extension lever 600.

Figure 5:
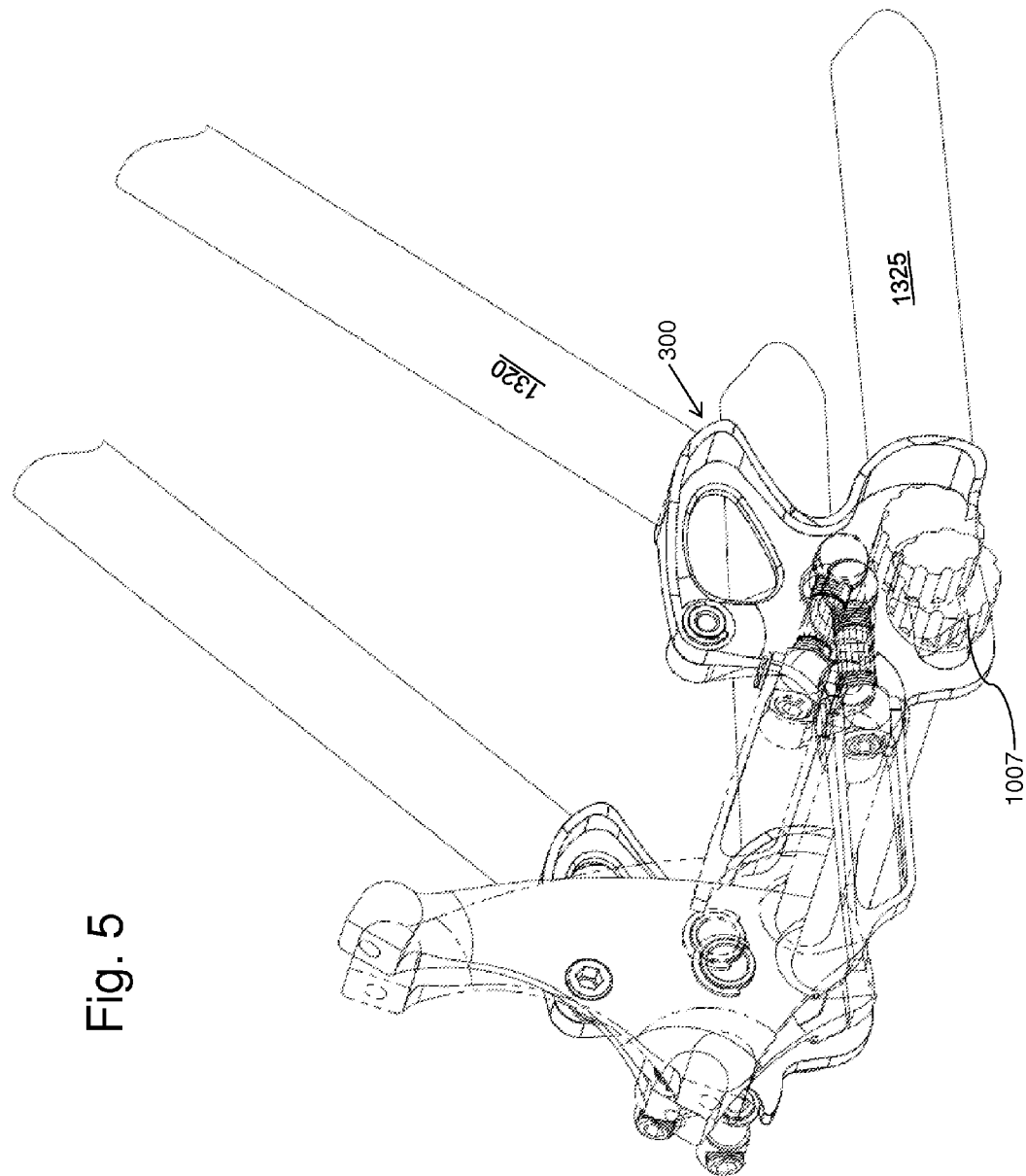
FIG. 5 is a perspective view of a disclosed embodiment in two different positions

FIG. 5 presents the combined positions of FIG. 3 and FIG. 4. In FIG. 5 a chain stay 1325 and a seat stay 1320 are shown in attachment to the main plate 300. An axle nut 1007 is shown protruding through the main plate.

Figure 7:
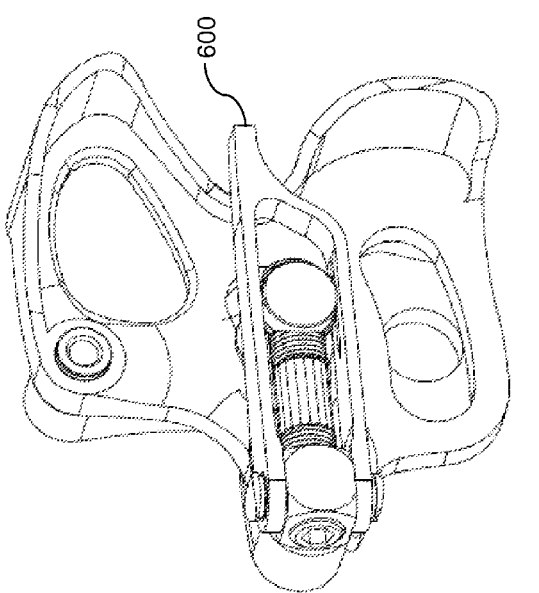
FIG. 7 is a perspective view of a disclosed embodiment
Figure 6:
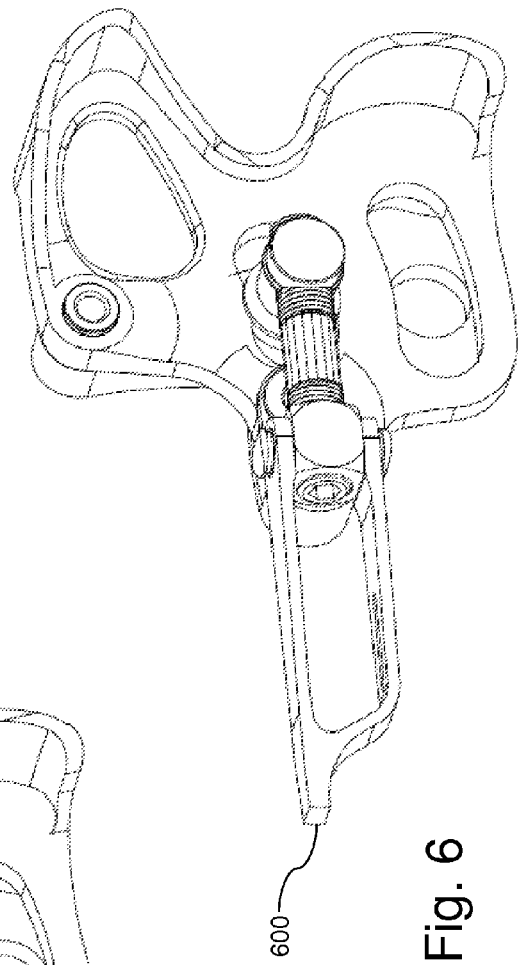
FIG. 6 is a perspective view of a disclosed embodiment

FIG. 6 presents the extension lever 600 in an open position, while FIG. 7 presents the extension lever 600 in a closed position.

Figure 8:
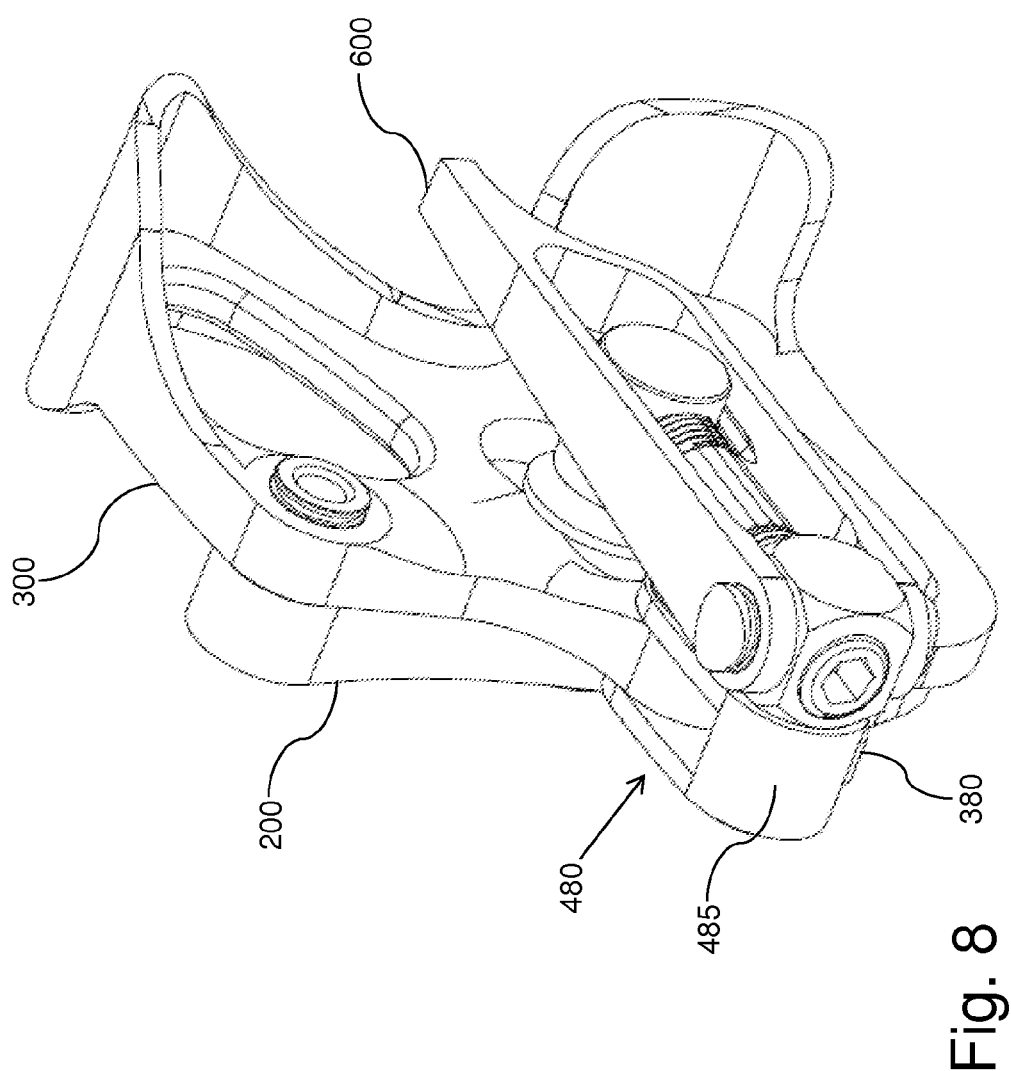
FIG. 8 is a perspective view of a disclosed embodiment

FIG. 8 presents a perspective view of a disclosed embodiment with the extension lever 600 in a closed position. The arc 485 of the link 380 rests or is otherwise stopped by the link stop 380 of the main plate 300.

Figure 9:
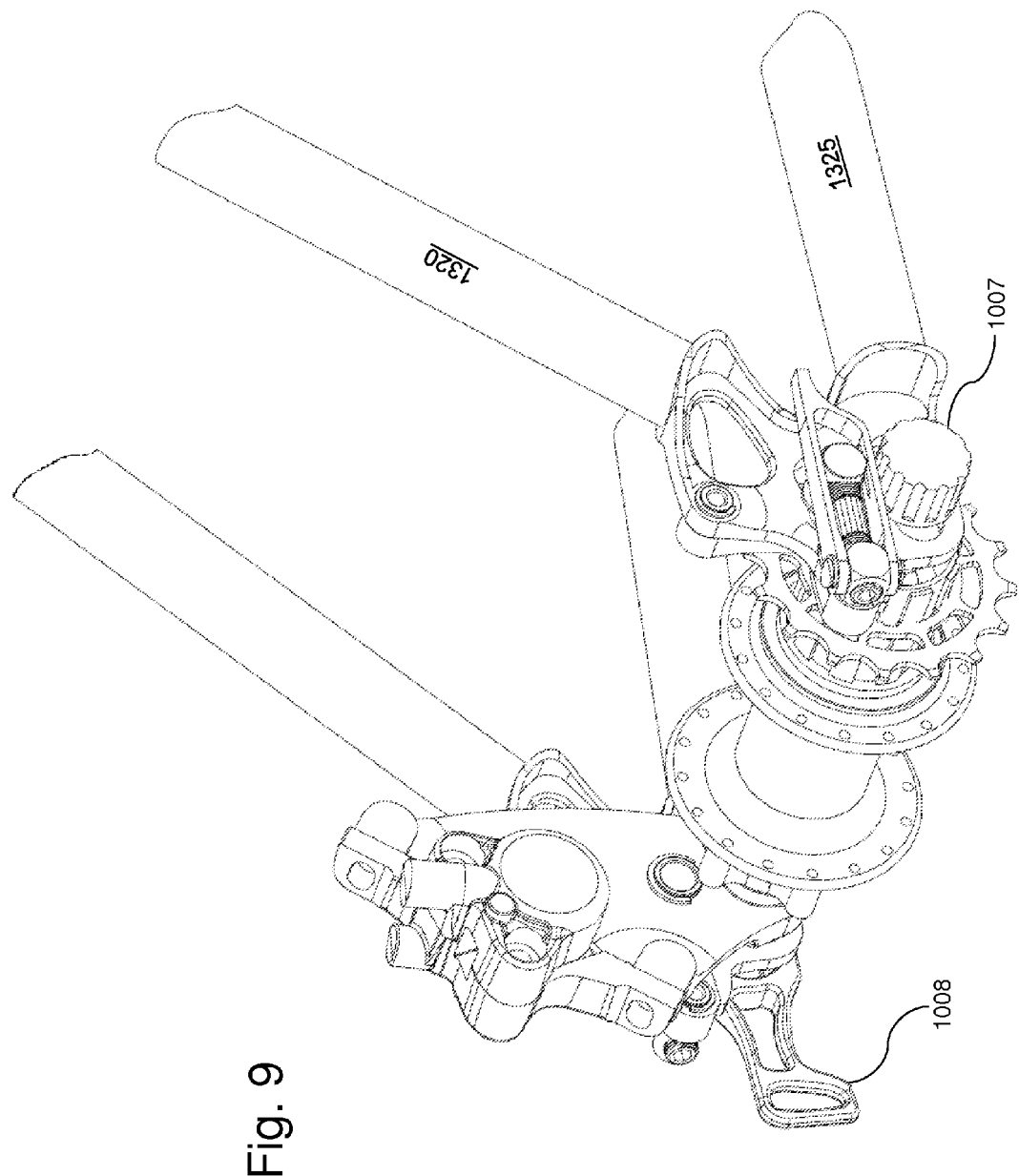
FIG. 9 is a perspective view of a disclosed embodiment attached to other bicycle components

FIG. 9 presents a perspective view of a disclosed embodiment attached to a seat stay 1320 and a chain stay 1325. A skewer nut 1007 may be attached to a wheel skewer having a quick release lever 1008.

FIG. 10 and FIG. 11 present two left side components that include skewer 1010 and quick release latches 1008 in different positions.

FIG. 12 presents left side components.

Figure 13:
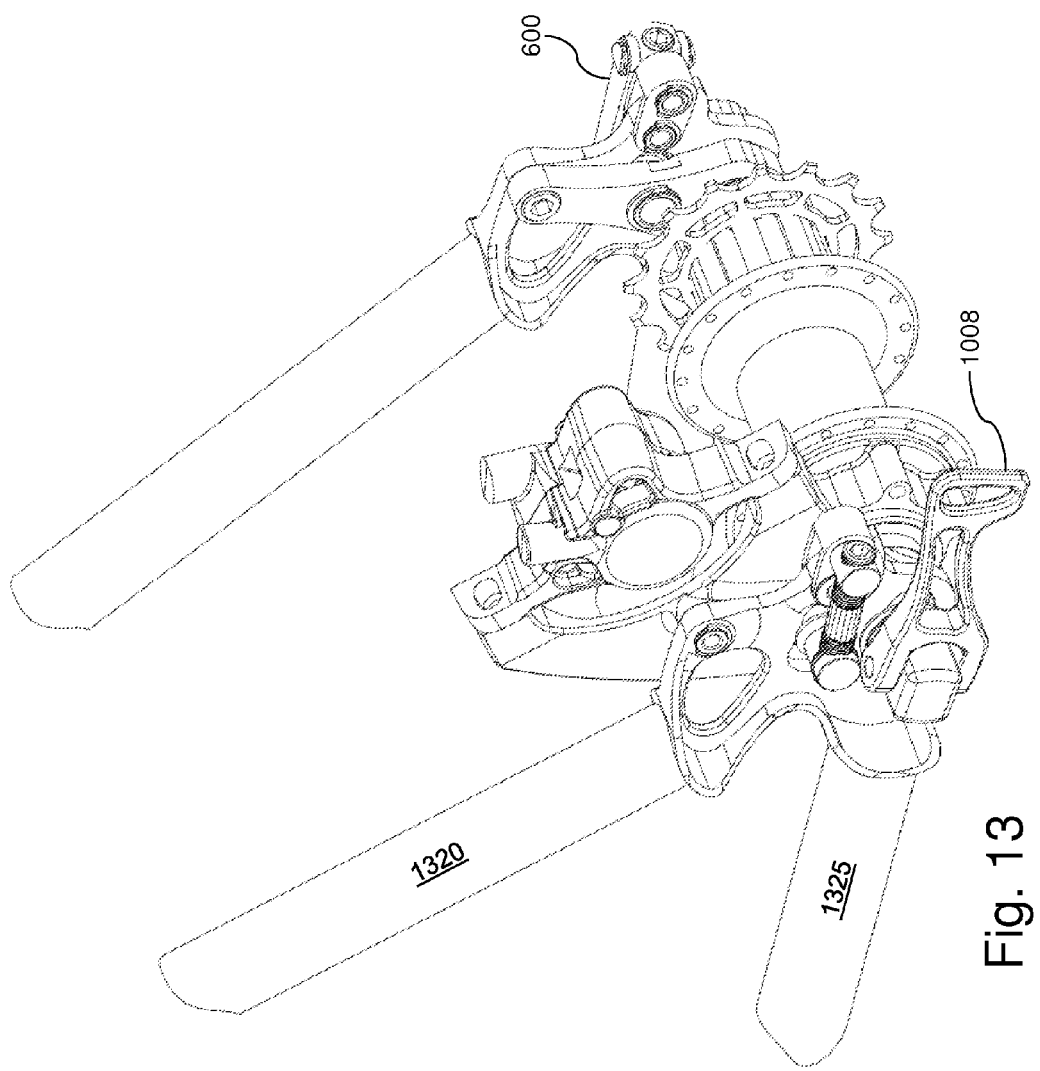
FIG. 13 is a perspective view of a disclosed embodiment attached to other bicycle components

FIG. 13 depicts a disclosed embodiment attached to other bicycle components.

Figure 14:
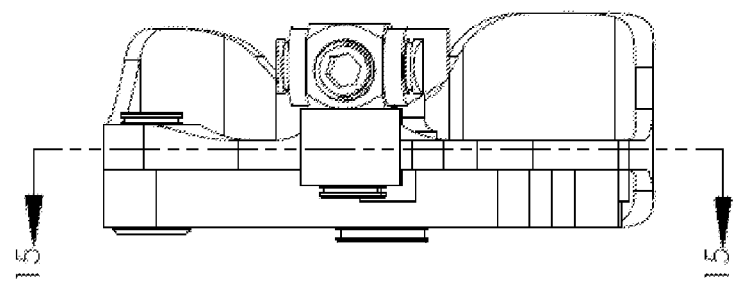
FIG. 14 is an elevation view of a disclosed embodiment
Figure 15:
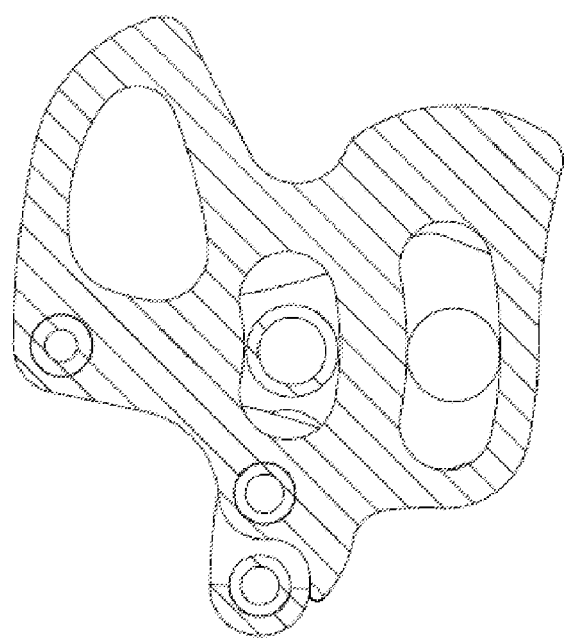
FIG. 15 is a sectional view of a disclosed embodiment

FIG. 14 presents an elevation view of disclosed components while FIG. 15 depicts a sectional view of disclosed components.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventor(s) contemplate the various aspects of the invention in any number of claim forms.

Disclosed embodiments may include the following items:

1. An adjustable bicycle dropout system, the system comprising:

a) a swing plate 200 defining a swing void 215, a swing plate adjustment pin void 220, and a skewer void 230;

b) a main plate 300 defining a main plate swing void 315, a void 350 for a swing plate adjusting pin, a link pivot pin void 370 and a main plate skewer void 330 and the main plate comprising a link stop 380, seat stay attachment point 320 and a chain stay attachment point 325;

c) a link 480 defining a pair of distal voids 482 and a pair of medial voids 481;

d) a link pivot pin 470;

e) a swing plate adjustment pin 400 defining a void 430 for a turn buckle screw and the swing plate adjustment pin further comprising a detent;

f) a turn buckle screw 450;

g) a right turn buckle screw nut 500 defining a void 530 comporting to the turn buckle screw and the right turn buckle screw nut 500 further comprising a link adjusting pin 520 and a pair of extension lever pins 510; and h) an extension lever 600 comprising a first flexible leg 610 and a second flexible leg 620 with each flexible leg defining a medial void 625 configured to accept an extension lever pin 510 of the right turn buckle screw nut 500.

2. The system of item 1 wherein the turn buckle screw comprises 450 a ribbed 465 area flanked by two sets of external treads 455 with the first set of external threads configured for entry into the void 430 of the swing plate adjustment pin 400 and the second set of external threads configured for entry into the void 530 of the right turn buckle screw nut 500.

3. The system of item 2 wherein the swing plate pivot pin 210 is pivotally attached to the swing plate 200 through the swing void 215 of the swing plate and the swing plate pivot pin 210 is further attached to the main plate 300 through the main plate swing void 315.

4. The system of item 3 wherein the link pivot pin 470 is secured through the medial voids 481 of the link 480 and the link pivot pin void 370 of the main plate 300.

5. The system of item 4 wherein the link 480 further comprises an arc 485 with the arc restrained by the link stop 380 of the main plate 300.

6. The system of item 5 wherein the:

a) swing plate adjustment pin 400 is fastened through the main plate void 350 for a swing plate adjustment pin and the swing plate adjustment pin 400 is fastened into the swing plate adjustment pin void 220;

b) a set of external threads 455 of the turn buckle screw 450 are threaded into the swing plate adjustment pin void 430 and a second set of external threads 460 of the turn buckle screw 450 are threaded into the void 530 of the right turn buckle screw nut 500;

c) the link adjustment pin 520 of the right turn buckle screw nut is disposed within the distal voids 482 of the link 480; and d) the extension lever pins 510 are disposed within the medial voids 625 of the extension lever 600.

7. The system of item 6 further comprising an opposite side system, the opposite side system comprising:

a) a swing plate 900 comprising defining a swing void 215, a swing plate adjustment pin void 220, and a skewer void 230;

b) a main plate 800 defining a main plate swing void 315, a void 350 for a swing plate adjusting pin, a link pivot pin void 370 and a main plate skewer void 330 and the main plate further comprising a link stop 380, seat stay attachment point 320 and a chain stay attachment point 325;

c) a link 480 defining a pair of distal voids 482 and a pair of medial voids 481;

d) a link pivot pin 470 d) a turn buckle screw 450;

e) a swing plate adjustment pin 400 defining a first void; and f) a left turn buckle nut 700 defining a first void.

8. The opposite side system of item 7 wherein:

a) the turn buckle screw 450 is disposed within the first void of the swing plate adjustment pin 400 and the first void of the left turn buckle nut 700;

b) the swing plate adjustment pin 400 is disposed within the main plate void 350 for a swing plate adjustment pin and fastened into the swing plate adjustment pin void 220;

c) the link 480 is secured to the main plate 800 with the link pivot pin 470 disposed within the medial voids 481 of the link 480 and with the link pivot pin disposed within the link pivot pin void 370.

What is claimed is:

1. An adjustable bicycle dropout system, the system comprising:

a) a swing plate defining a swing void, a swing plate adjustment pin void, and a skewer void;

b) a main plate defining a main plate swing void, a void for a swing plate adjustment pin, a link pivot pin void and a main plate skewer void and the main plate comprising a link stop, seat stay attachment point and a chain stay attachment point;

c) a link defining a pair of distal voids and a pair of medial voids;

d) a link pivot pin;

e) a swing plate adjustment pin defining a void for a turn buckle screw and the swing plate adjustment pin further comprising a detent;

f) a turn buckle screw;

g) a right turn buckle screw nut defining a void comporting to the turn buckle screw and the right turn buckle screw nut further comprising a link adjusting pin and a pair of extension lever pins; and h) an extension lever comprising a first flexible leg and a second flexible leg, with each flexible leg defining a medial void configured to accept an extension lever pin of the right turn buckle screw nut.

2. The system of claim 1 wherein the turn buckle screw comprises a ribbed area flanked by two sets of external treads with the first set of external threads configured for entry into the void of the swing plate adjustment pin and the second set of external threads configured for entry into the void of the right turn buckle screw nut.

3. The system of claim 2 wherein a swing plate pivot pin is pivotally attached to the swing plate through the swing void of the swing plate and the swing plate pivot pin is further attached to the main plate through the main plate swing void.

4. The system of claim 3 wherein the link pivot pin is secured through the medial voids of the link and the link pivot pin void of the main plate.

5. The system of claim 4 wherein the link further comprises an arc with the arc restrained by the link stop of the main plate.

6. The system of claim 5 wherein:

a) the swing plate adjustment pin is fastened through the main plate void for a swing plate adjustment pin and the swing plate adjustment pin is fastened into the swing plate adjustment pin void;

b) a set of external threads of the turn buckle screw are threaded into the swing plate adjustment pin void and a set of external threads of the turn buckle screw are threaded into the void of the right turn buckle screw nut;

c) the link adjusting pin of the right turn buckle screw nut is disposed within the distal voids of the link; and d) the extension lever pins are disposed within the medial voids of the extension lever.

7. The system of claim 6 further comprising an opposite side system, the opposite side system comprising:

a) a swing plate defining a swing void, a swing plate adjustment pin void, and a skewer void;

b) a main plate defining a main plate swing void, a void for a swing plate adjustment pin, a link pivot pin void and a main plate skewer void and the main plate further comprising a link stop, seat stay attachment point and a chain stay attachment point;

c) a link defining a pair of distal voids and a pair of medial voids;

d) a link pivot pin;

e) a turn buckle screw;

f) a swing plate adjustment pin defining a first void; and g) a left turn buckle nut defining a first void.

8. The opposite side system of claim 7 wherein:

a) the turn buckle screw is disposed within the first void of the swing plate adjustment pin and the first void of the left turn buckle nut;

b) the swing plate adjustment pin is disposed within the main plate void for the swing plate adjustment pin and fastened into the swing plate adjustment pin void;

c) the link is secured to the main plate with the link pivot pin disposed within the medial voids of the link and with the link pivot pin disposed within the link pivot pin void.

* * * * *